United States Patent
Wu et al.

(10) Patent No.: US 10,033,513 B2
(45) Date of Patent: Jul. 24, 2018

(54) CHANNEL IMPULSE RESPONSE ESTIMATION FOR FULL-DUPLEX COMMUNICATION NETWORKS

(71) Applicants: Huan Wu, Kanata (CA); Eddy Shi-Ning Hum, Ottawa (CA); Philippe A. Guillemette, Stittsville (CA)

(72) Inventors: Huan Wu, Kanata (CA); Eddy Shi-Ning Hum, Ottawa (CA); Philippe A. Guillemette, Stittsville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 48 days.

(21) Appl. No.: 14/879,941

(22) Filed: Oct. 9, 2015

(65) Prior Publication Data

US 2016/0315754 A1    Oct. 27, 2016

Related U.S. Application Data

(60) Provisional application No. 62/151,632, filed on Apr. 23, 2015.

(51) Int. Cl.
*H04L 5/14* (2006.01)
*H04L 25/02* (2006.01)
(Continued)

(52) U.S. Cl.
CPC ........ *H04L 5/1461* (2013.01); *H04J 11/0023* (2013.01); *H04L 5/0062* (2013.01);
(Continued)

(58) Field of Classification Search
CPC ............... H04L 5/1461; H04L 25/0226; H04L 25/0204; H04L 25/0212; H04L 25/0228; H04L 5/0062; H04J 11/0023
See application file for complete search history.

(56) References Cited

U.S. PATENT DOCUMENTS 6,959,047 B1 *  10/2005  Al-Dhahir ............ H04B 7/0669
                                                            342/367
2006/0109938 A1 *  5/2006  Challa ............... H04L 25/03006
                                                            375/347

(Continued)

FOREIGN PATENT DOCUMENTS

CN    103166883    6/2013
CN    103516638    1/2014
(Continued)

OTHER PUBLICATIONS

R. Zhang, X. Cheng, M. Ma and B. Jiao, "Interference-avoidance pilot design using ZCZ sequences for multi-cell MIMO-OFDM systems," 2012 IEEE Global Communications Conference (GLOBECOM), Anaheim, CA, 2012, pp. 5056-5061.*

(Continued)

*Primary Examiner* — Edan Orgad
*Assistant Examiner* — Ivan O Latorre

(57) ABSTRACT

A network-wide interference cancellation scheme estimates channel impulse responses related to Self Interference and the Mutual Interference, then reduces both the Self Interference and the Mutual Interference in the receiver of an Full Duplex device. Full Duplex gains may be capitalized upon and translated into system gain. The scheme is based on an extended Multiple-Input-Multiple-Output (MIMO) treatment of the whole Full Duplex network. The network-wide interference cancellation may be seen to be feasible when a unique pilot signal design and training structure are in place network-wide.

25 Claims, 11 Drawing Sheets

(51) Int. Cl.
*H04J 11/00* (2006.01)
*H04L 5/00* (2006.01)

(52) U.S. Cl.
CPC ...... *H04L 25/0204* (2013.01); *H04L 25/0212* (2013.01); *H04L 25/0226* (2013.01); *H04L 25/0228* (2013.01)

(56) References Cited

U.S. PATENT DOCUMENTS

| | | | |
|---|---|---|---|
| 2008/0232235 A1* | 9/2008 | Kowalski | H04J 11/00 370/203 |
| 2009/0034437 A1* | 2/2009 | Shin | H04B 7/15585 370/278 |
| 2009/0190634 A1* | 7/2009 | Bauch | H04B 7/2606 375/211 |
| 2011/0143655 A1* | 6/2011 | Ahn | H04B 7/15542 455/9 |
| 2012/0224610 A1* | 9/2012 | Baldemair | H04B 7/15585 375/211 |
| 2013/0083672 A1* | 4/2013 | Johansson | H04W 72/082 370/252 |
| 2013/0286903 A1* | 10/2013 | Khojastepour | H04L 5/14 370/280 |
| 2014/0016515 A1* | 1/2014 | Jana | H04L 5/143 370/278 |
| 2014/0018090 A1* | 1/2014 | Khoryaev | H04W 52/04 455/452.1 |
| 2014/0050124 A1* | 2/2014 | Yang | H04B 1/10 370/278 |
| 2014/0348032 A1* | 11/2014 | Hua | H04B 1/44 370/277 |
| 2015/0078281 A1* | 3/2015 | Kishiyama | H04W 48/18 370/329 |
| 2015/0085840 A1* | 3/2015 | Liu | H04W 72/0446 370/336 |
| 2015/0103802 A1* | 4/2015 | Cheng | H04L 5/0048 370/330 |
| 2015/0131491 A1* | 5/2015 | Rikkinen | H04L 5/003 370/278 |
| 2015/0229461 A1* | 8/2015 | DiFazio | H04L 5/14 370/280 |
| 2015/0333933 A1* | 11/2015 | Lopez de Victoria | H04L 25/0224 375/343 |
| 2015/0341157 A1* | 11/2015 | Eltawil | H04L 5/1453 370/278 |
| 2016/0044663 A1* | 2/2016 | Yao | H04W 80/00 370/336 |
| 2016/0226535 A1* | 8/2016 | Choi | H04B 1/525 |
| 2016/0233903 A1 | 8/2016 | Wu et al. | |
| 2016/0233904 A1 | 8/2016 | Wu et al. | |
| 2016/0338049 A1* | 11/2016 | Takeda | H04L 5/001 |
| 2017/0222775 A1* | 8/2017 | Coomans | H04L 5/0032 |
| 2018/0006690 A1* | 1/2018 | Shepard | H04B 7/0456 |

FOREIGN PATENT DOCUMENTS

| | | | |
|---|---|---|---|
| CN | 103684564 | 3/2014 | |
| EP | 2053816 A1 | 4/2009 | |
| EP | 2860925 A1 | 4/2015 | |
| EP | 3057248 A1 | 8/2016 | |
| WO | WO 2014/000432 * | 1/2014 | H04L 25/02 |
| WO | 2015053583 A1 | 4/2015 | |
| WO | WO 2015048678 | 4/2015 | |

OTHER PUBLICATIONS

Choi, H.-H., "On the Design of User Pairing Algorithms in Full Duplexing Wireless Cellular Networks", IEEE International Conference on Information and Communication Technology Convergence (ICTC), Oct. 2014, pp. 490-495.
Goyal, S. et al., "Analyzing a Full-Duplex Cellular System", IEEE 47th Annual Conference on Information Sciences and Systems (CISS), Mar. 2013, pp. 1-6.
Han, S. et al., "Full Duplex Networking: Mission Impossible?", arXiv:1410.5326v1, Oct. 2014.
Simeone, O. et al., "Full-Duplex Cloud Radio Access Networks: An Information-Theoretic Viewpoint", IEEE Wireless Communications Letters, vol. 3, No. 4, Aug. 2014, pp. 413-416.
Third Generation Partnership Project, "LTE; Evolved Universal Terrestrial Radio Access (E-UTRA); Physical Channels and Modulation (Release 10)", 3GPP TS 36.211 V10.0.0 (Jan. 2011).
International Search Report; PCT/CN2016/079846; dated Jul. 13, 2016.
Hong et al.; "Applications of Self-Interference Cancellation in 5G and Beyond"; IEEE Communications Magazine; Feb. 2014; 8 pages.
Duarte, et al.; "Design and Characterization of a Full-Duplex Multiantenna System for WiFi Networks"; IEEE Transaction on Vehicular Technology, vol. 63, No. 3, Mar. 2014; 18 pages.
Bharadia, et al.; "Full Duplex MIMO Radios"; 11th USENIX Symposium on Networked Systems Design and Implementation; Apr. 2-4, 2014; 15 pages.
Herath, et at.; "Sum-Rate Performance and Impact of Self-Interference Cancellation on Full-Duplex Wireless Systems" 2013 IEEE 24th International Symposium on Personal, Indoor and Mobile Radio Communications: Fundamentals and PHY Track; 5 pages.

* cited by examiner

CHANNEL IMPULSE RESPONSE ESTIMATION FOR FULL-DUPLEX COMMUNICATION NETWORKS

CROSS-REFERENCE TO RELATED APPLICATIONS

The present application claims priority to U.S. Patent Application No. 62/151,632, filed Apr. 23, 2015, the contents of which are hereby incorporated herein by reference. The present application is related to U.S. patent application Ser. No. 14/617,598, filed Feb. 9, 2015, the contents of which are hereby incorporated herein by reference. The present application is also related to U.S. patent application Ser. No. 14/617,679, filed Feb. 9, 2015, the contents of which are hereby incorporated herein by reference.

FIELD

The present application relates, generally, to full-duplex communication networks and, more specifically, to channel impulse response estimation for such networks.

BACKGROUND

Full-duplex (FD) radio involves use of the same time and frequency resources for each direction in bidirectional communications. The spectral efficiency can be optimized and there is potential for doubling the capacity for a given resource compared to half-duplex (HD) communications. Because of potential benefits in the physical layers and other benefits in upper layers, FD has been considered one of the enabling technologies for future 5G wireless communication systems.

SUMMARY

A network-wide interference cancellation scheme may be shown to reduce both self interference and mutual interference in the receiver of an FD device to a desired level. The scheme is based on an extended Multiple-Input-Multiple-Output (MIMO) treatment of a whole FD network. The network-wide interference cancellation may be seen to be feasible when a unique pilot signal design and training structure are in place network-wide.

According to an aspect of the present disclosure, there is provided a method of operating a device. The method includes transmitting, by a transmit antenna of the device, a first pilot signal selected from a plurality of mutually orthogonal pilot signals, receiving, by a receive antenna of the device, a first received signal including the first pilot signal and a second pilot signal selected from the plurality of mutually orthogonal pilot signals, the second pilot signal transmitted by a transmit antenna of a distinct device, estimating, by the device based on the first pilot signal, a first channel impulse response (CIR) for a communications channel between the transmit antenna and the receive antenna and estimating, by the device based on the second pilot signal, a second CIR for a communication channel between the transmit antenna of the distinct device and the receive antenna. In other aspects of the present disclosure, there is provided a computer readable medium for storing instruction that, when executed by a processor in a device, cause the processor to carry out this method.

According to another aspect of the present disclosure, there is provided a device comprising a receive antenna, a transmit antenna, a transmitter configured to transmit, via the transmit antenna, a first pilot signal selected from a plurality of pilot signals, a processor and a receiver operatively coupled to the processor, the receiver configured to receive a first received signal including the first pilot signal and a second pilot signal selected from the plurality of mutually orthogonal pilot signals, the second pilot signal transmitted by a transmit antenna of a distinct device. The processor is configured to estimate, based on the first pilot signal, a first channel impulse responses (CIR) for a communications channel between the transmit antenna and the receive antenna and estimate, based on the second pilot signal, a second CIR for a communications channel between the transmit antenna of the distinct device and the receive antenna.

Other aspects and features of the present disclosure will become apparent to those of ordinary skill in the art upon review of the following description of specific implementations of the disclosure in conjunction with the accompanying figures.

BRIEF DESCRIPTION OF THE DRAWINGS

Reference will now be made, by way of example, to the accompanying drawings which show example implementations, and in which.

DETAILED DESCRIPTION

One challenge for an FD-capable device (e.g., a full duplex capable base station, hereinafter "FD-BS," or full duplex capable user equipment, hereinafter "FD-UE") is how to effectively cancel the self-interference (SI) that includes the leakage and reflections of its own transmitting signal. Notably, the SI can be shown to be more than 100 dB stronger than the sensitivity level in the receiver. In the past few years, the SI cancellation techniques have attracted attention from both industry and academia. Notably, remarkable progress has been made in design, implementation and improved performance.

An air interface upgrade may be proposed for wireless network systems that both enables FD-BS and is backward compatible with legacy UEs. A unique and non-intrusive training structure for FD-BS may be introduced in the air interface with orthogonal pilot signals.

The implication and impact of FD-enabled devices on the whole wireless network have been among the subjects of recent studies. One issue that may be shown to be particularly detrimental to system gain is additional mutual interference (MI) among FD-enabled devices when all or some of them are operating in full-duplex mode. The focus of such studies is on the impact of residual MI on the system and generally such studies consider that MI can be, somehow, canceled or mitigated.

Figure 1:
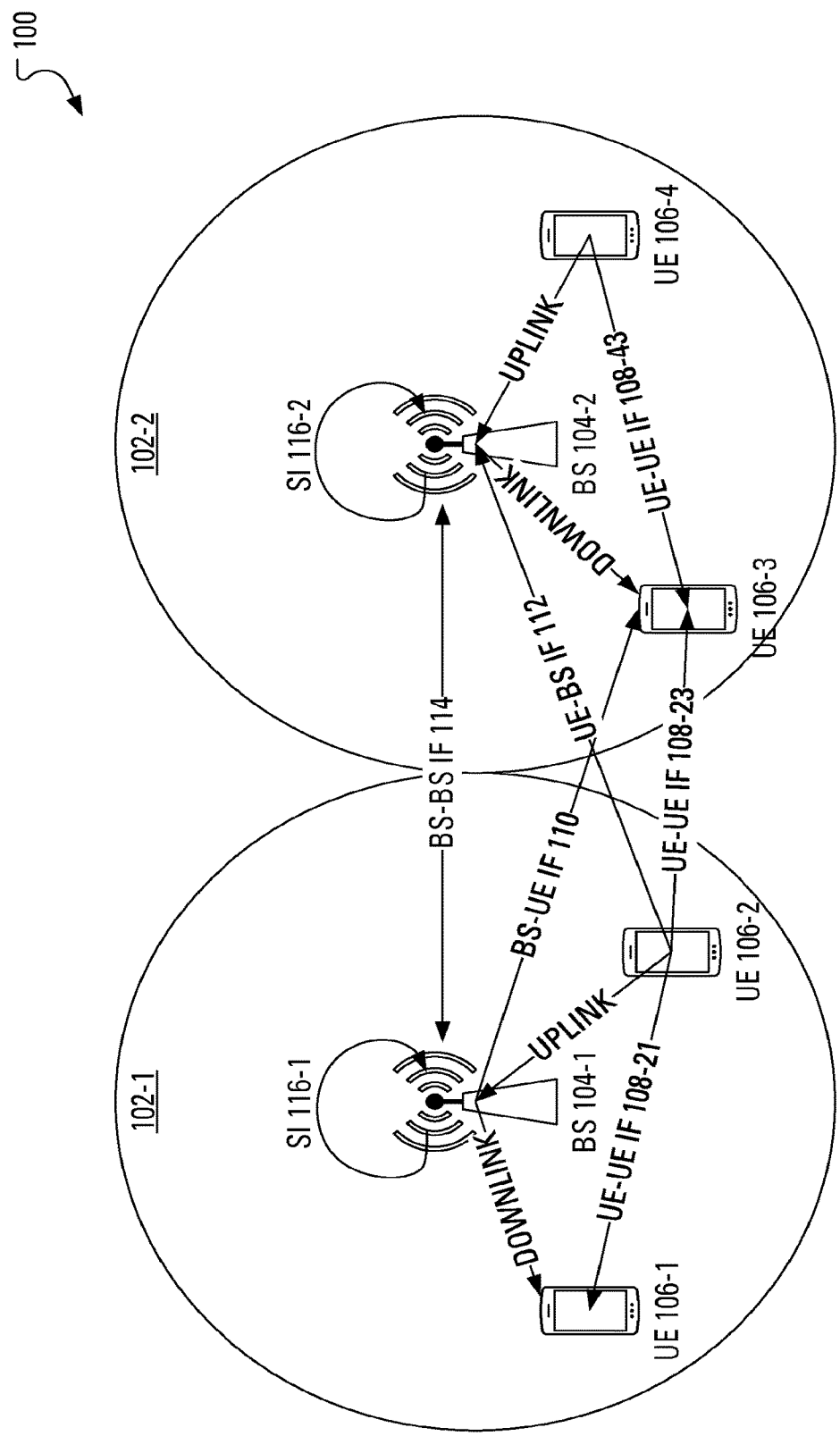
FIG. 1 illustrates a wireless network.

FIG. 1 illustrates a wireless network 100 including two BSs 104-1 and 104-2, with respective coverage areas 102-1 and 102-2. The BSs may be referenced collectively or individually by reference number 104. Also illustrated in FIG. 1 are four UEs: a first UE 106-1; a second UE 106-2; a third UE 106-3; and a fourth UE 106-4 (collectively or individually 106).

The Third Generation Partnership Project (3GPP) is responsible for standardizing Long Term Evolution (LTE) 4G wireless networks with Time-Division Duplexing (LTE-TDD). In traditional LTE-TDD, with a frequency reuse of one, the network interference may be shown to be based upon BS-UE co-channel interference (IF). Such co-channel interference may be observed on the uplink (UL) slot at a BS (UE-BS IF) and may be observed on the downlink DL slot at a UE (BS-UE IF). In such traditional LTE-TDD networks, inter-cell interferences from BS to BS (BS-BS IF) and from UE to UE (UE-UE IF) are largely avoided due to synchronization on a common UL-DL configuration across the entire network. Similarly, in such traditional LTE-TDD networks, intra-cell interferences from UE to UE (UE-UE IF) are largely avoided due to synchronization on a common UL-DL configuration across the entire network.

In contrast, in an FD-enabled network (hereinafter, an "FD-Net"), where the BSs in the network may operate in FD mode, the self-interference is most dominant in an FD-BS. The inter-cell interference and the intra-cell interference pertaining to the FD network (BS-BS IF and UE-UE IF) can be relatively significant due to the UL time slot of one device (BS or UE) being the same time slot and resource block (RB) with the DL of another device.

In FIG. 1, the first BS 104-1 and the second BS 104-2 operate in FD mode while all four of the UEs 106 operate in legacy half duplex mode.

One type of interference in the FD-Net 100 of FIG. 1 is self-interference 116-0, 116-1, which may be considered to arise from coupling and reflection of a transmitted signal back to a receiver in the FD-BS 104.

Another type of interference in the FD-Net 100 of FIG. 1 is BS to BS interference (BS-BS IF) 114, which may be defined as transmitting signal in a FD-BS 104 received by a neighboring FD-BS 104. BS-BS IF can be observed simultaneously in all neighboring FD-BSs 104 as a result of mutual interference on the shared RBs. That is, for a given RB that is shared by the first BS 104-1 and the second BS 104-2, the first BS 104-1 can experience BS-BS IF from the second BS 104-2 while, at the same time, the second BS 104-2 can experience BS-BS IF from the first BS 104-1.

A further type of interference in the FD-Net 100 of FIG. 1 is UE to UE interference (UE-UE IF). When two HD-UEs 106 are scheduled in the same slot by an FD-BS 104 to operate respectively for UL and DL, the transmitting signal (UL) from one UE 106 may be shown to interfere with the receiving of the DL signal at another UE 106. This interference may be caused by another UE in the same cell (intra-cell UE-UE IF 108-21, 108-43) or in a neighboring cell (inter-cell UE-UE IF 108-23).

In addition, BS-UE interference (BS-UE IF) 110 and UE-BS interference (UE-BS IF) 112 may be considered to be a type of co-channel interference inherited from the legacy HD network (HD-Net). It can be seen on both BSs 104 and UEs 106 as a result of scheduling two or more UEs 106 in neighboring cells on the same RBs in DL and/or UL.

In overview, interference observed at the FD-BS 104 in the FD-Net 100 can be, at least partially, cancelled. In particular, the focus is on cancellation of SI 116 and BS-BS IF 114. Notably, however, aspects of the present application may be applied to cancellation of UE-BS IF 112 and may be found to be applicable to that of UE-UE IF 108 at the UEs 106.

In a typical full-duplex device (e.g., a BS 104 or a UE 106), cancellation of self-interference has two steps involved. The first step involves establishment of a dedicated half-duplex training period. During the training period, a pilot signal is transmitted by the FD device. A pilot signal may also be known as a training signal. The receiver of the FD device may then estimate the contributions from various mechanisms that lead to the SI. Such mechanisms may include, for example, leakage, coupling and reflections. The second step, which occurs during normal communications, involves reconstruction of a copy of the SI based on the estimated channel and the knowledge of the transmitted signal. The underlying infrastructure for an FD device can be summarized as follows:

1) A pilot signal for MIMO channel estimation;
2) An HD training period dedicated to FD channel estimation; and
3) Availability of transmitting data for interference reconstruction.

The general approach to the cancellation of BS-BS IF 114 in a full-duplex enabled network is to leverage, to the extent practical, the existing infrastructure for cancellation of SI 116, while taking into account BS-BS IF 114 from neighboring BSs 104. There are several differences between cancellation of SI 116 at a BS 104 in an FD-Net and cancellation of SI 116 in a single BS 104.

Using the first BS 104-1 in FIG. 1 as an example BS, one of the differences is based upon a difference between the propagation channel that the BS-BS IF 114 undergoes and the propagation channel that SI 116-0 undergoes. Furthermore, differences may be seen between the propagation channel that the BS-BS IF 114 undergoes and the propagation channel undergone by other BS-BS IF, say, from a third BS (not shown). Specifically, the delay spread of the channel impulse response (CIR) for BS-BS IF 114 will differ from one BS 104 to another BS 104.

The size of the extended MIMO setup to include both SI 116 and BS-BS IF 114 could be significantly larger if multiple neighboring BSs 104 are considered.

A backhaul (in the case of distributed BSs 104) data link or a fronthaul (in the case of centralized BSs, like those employed in a Cloud Radio Access Network, or C-RAN) data link may be employed for tunneling transmit data across BSs 104. It is understood herein that the capacity of the data link is sufficient and the link is lossless for the data transfer.

Figure 2:
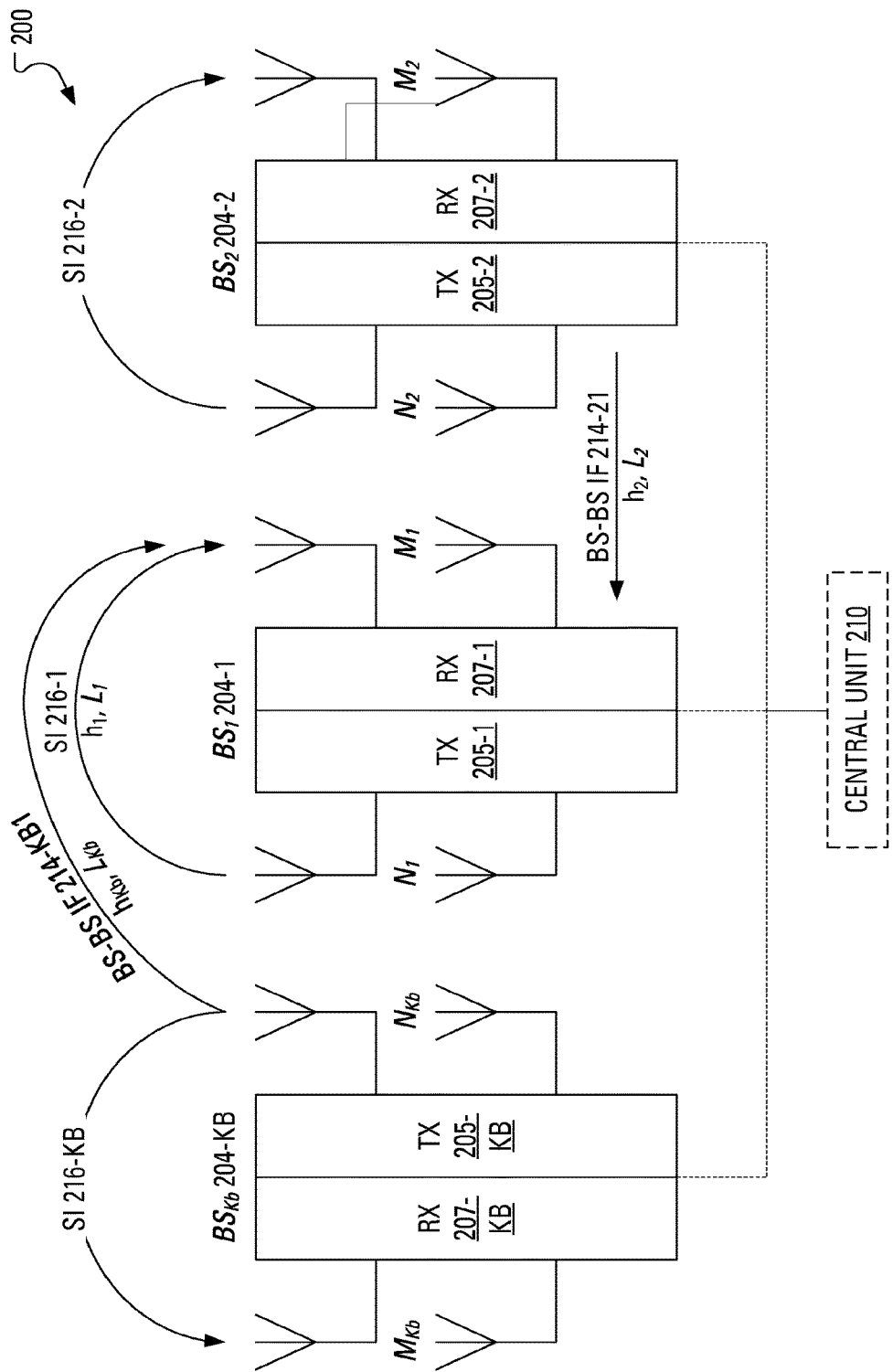
FIG. 2 illustrates a full-duplex network having a plurality of base stations.

An FD-Net 200 is illustrated in FIG. 2 to allow consideration of operation of a BS in an environment with both SI and BS-BS IF. In the following sections, a design for pilot signals and an allocation of a training period allow for cancellation of both SI and BS-BS IF in the FD-Net 200.

FIG. 2 illustrates a first FD-BS, $BS_1$ 204-1, in the FD-Net 200. The FD-Net 200 generically includes $K_b$ FD-BSs, however, only two further FD-BSs are illustrated in FIG. 2, referenced as a second $BS_2$ 204-2 and a $K_b$th $BS_{Kb}$ 204-KB. Accordingly, the first $BS_1$ 204-1 is affected by its own SI as well as BS-BS IF from BSs in neighboring cells.

The first $BS_1$ 204-1 includes a first transmitter 205-1 and a first receiver 207-1. The second $BS_2$ 204-2 includes a second transmitter 205-2 and a second receiver 207-2. The $K_b$th $BS_{Kb}$ 204-KB includes a $K_b$th transmitter 205-KB and a $K_b$th receiver 207-KB. There is first SI 216-1 at the first $BS_1$ 204-1. There is second SI 216-2 at the second $BS_2$ 204-2. There is $K_b$th SI 216-KB at the $K_b$th $BS_{Kb}$ 204-KB. The first $BS_1$ 204-1 is also illustrated as experiencing BS-BS IF 214-21 from the second $BS_2$ 204-2 and BS-BS IF 214-KB1 from the $K_b$th $BS_{Kb}$ 204-KB.

To support legacy half-duplex devices, existing half-duplex frame structures may be modified to support full-duplex communications, including the transmission of pilot signals to allow for channel estimation. As an illustrative example, the 3GPP LTE TDD frame structure may be modified to support full-duplex communications.

Figure 3:
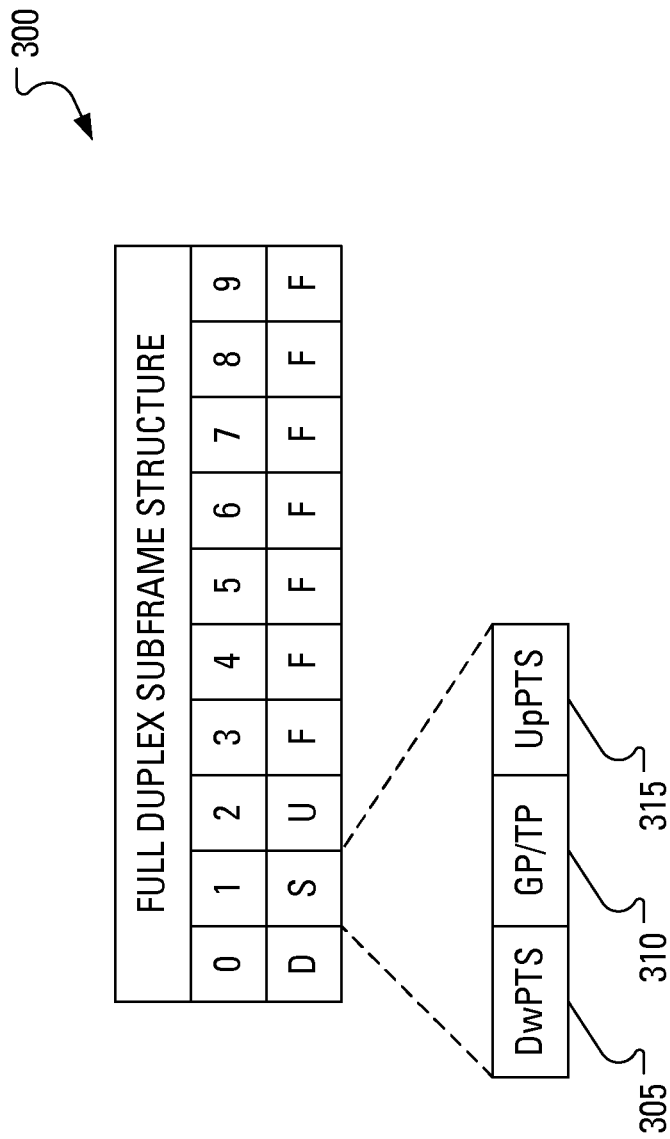
FIG. 3 illustrates an example full-duplex subframe structure.

FIG. 3 illustrates an example full-duplex subframe structure 300. The full-duplex subframe structure 300 is based on subframe configuration 3 for a 3GPP LTE TDD compliant communications system (see 3GPP TS 36.211: "Evolved Universal Terrestrial Radio Access; Physical channels and modulation—Table 4.2-1: Configuration of special subframe). Subframes 0 and 2 of the full-duplex subframe structure 300 may be used for downlink (D) transmissions and uplink (U) transmissions, respectively. Subframe 1 of the full-duplex subframe structure 300 may be a special (S) subframe including a Downlink Pilot Time Slot (a DwPTS) portion 305, a guard period/training period (GP/TP) portion 310 and an Uplink Pilot Time Slot (UpPTS) portion 315. The GP/TP portion 310 may serve several purposes. When the full-duplex subframe structure 300 is used in conjunction with a legacy (half-duplex) BS, for example, the GP/TP portion 310 may serve as a GP between the DwPTS portion 305 and the UpPTS portion 315 for the switching from downlink transmission to uplink transmission. However, when the full-duplex subframe structure 300 is used in conjunction with a full-duplex BS, for example, the GP/TP portion 310 may also be used to allow full-duplex devices to perform CIR estimation in accordance with a pilot signal transmitted in half-duplex GP/TP portion 310. The length of the GP/TP portion 310 may be adjusted using special subframe configurations.

The seven remaining subframes of the full-duplex subframe structure 300 are flexible (F) subframes, meaning that each subframe may be used for downlink transmissions and/or uplink transmissions. In other words, one or more uplink transmissions and/or one or more downlink transmissions may be scheduled for each subframe. The scheduling for the subframes that may be used in a flexible manner may be optimized based on a number of criteria, such as maximum capacity, interference constraints and the like. From a UE's perspective, the UE may be well served if it is able to prepare an uplink transmission or a downlink reception based on scheduling assignments received on a control channel or higher layer signaling. Examples of higher layer signaling include radio resource control (RRC) signaling.

Figure 4:
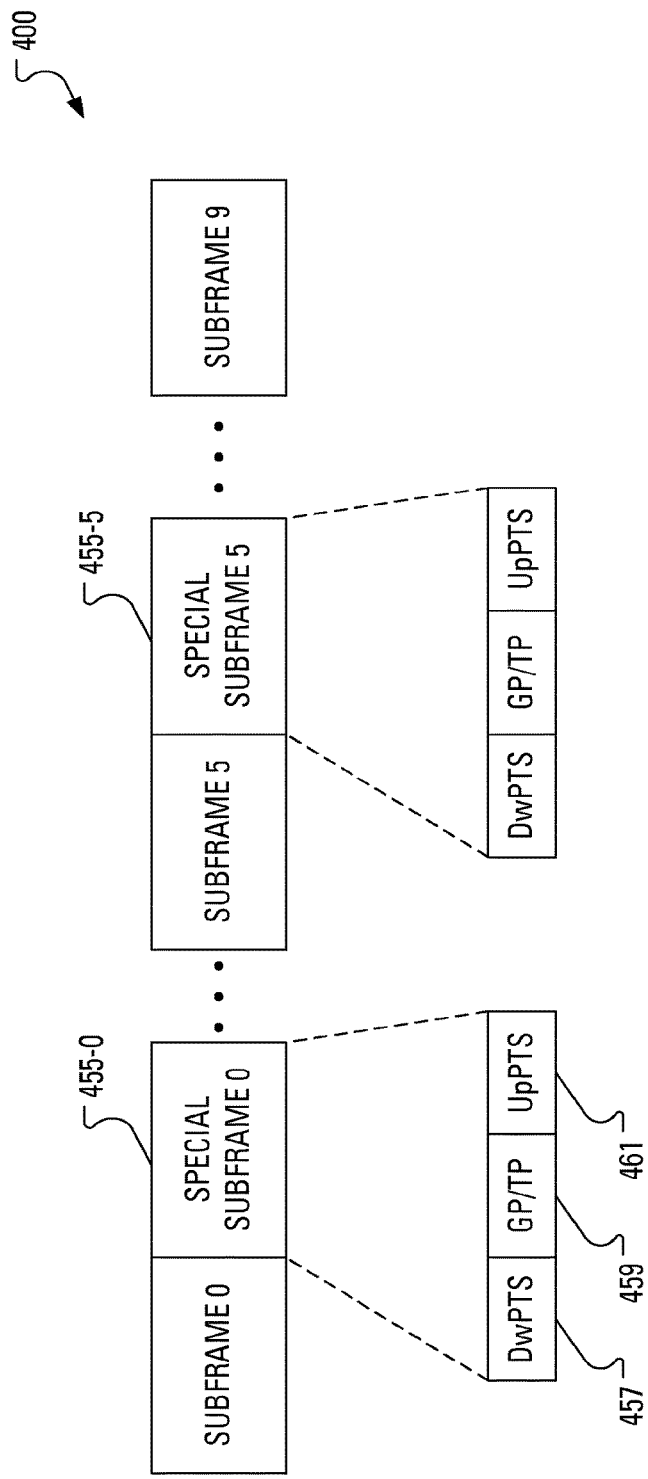
FIG. 4 illustrates an example sequence of subframes of a frame for a communications system supporting full-duplex operation, the sequence of subframes including special subframes.

FIG. 4 illustrates an example sequence of subframes of a frame 400 for a communications system supporting full-duplex operation. The frame 400 includes a zeroth special subframe 455-0 comprising a DwPTS portion 457, a GP/TP portion 459 and an UpPTS portion 461. The frame 400 also includes a fifth special subframe 455-5 with a structure consistent with the structure of the zeroth special subframe 455-0. For communications systems supporting full-duplex operation utilizing extensions to certain 3GPP LTE TDD compliant communications systems, a representative frame may be similar. The length, as well as the periodicity, of the training period may be dependent upon environmental and/or communications system factors. As an illustrative example, if there is a need for a signal to noise ratio (SNR) threshold of a channel estimator at a receiver to be exceeded for correct operation, then the length and/or periodicity of the training period is set in manner that allows the SNR threshold to be exceeded. If there is a requirement that the repetition of the training period is less than a time coherence of the channel, for example, then the length of the training period is set to less than the time coherence of the channel. A detailed discussion presenting frame structures supporting full-duplex operation is presented in U.S. patent application Ser. No. 14/617,679, filed Feb. 9, 2015, which application is commonly assigned and hereby incorporated herein by reference.

Figure 5:
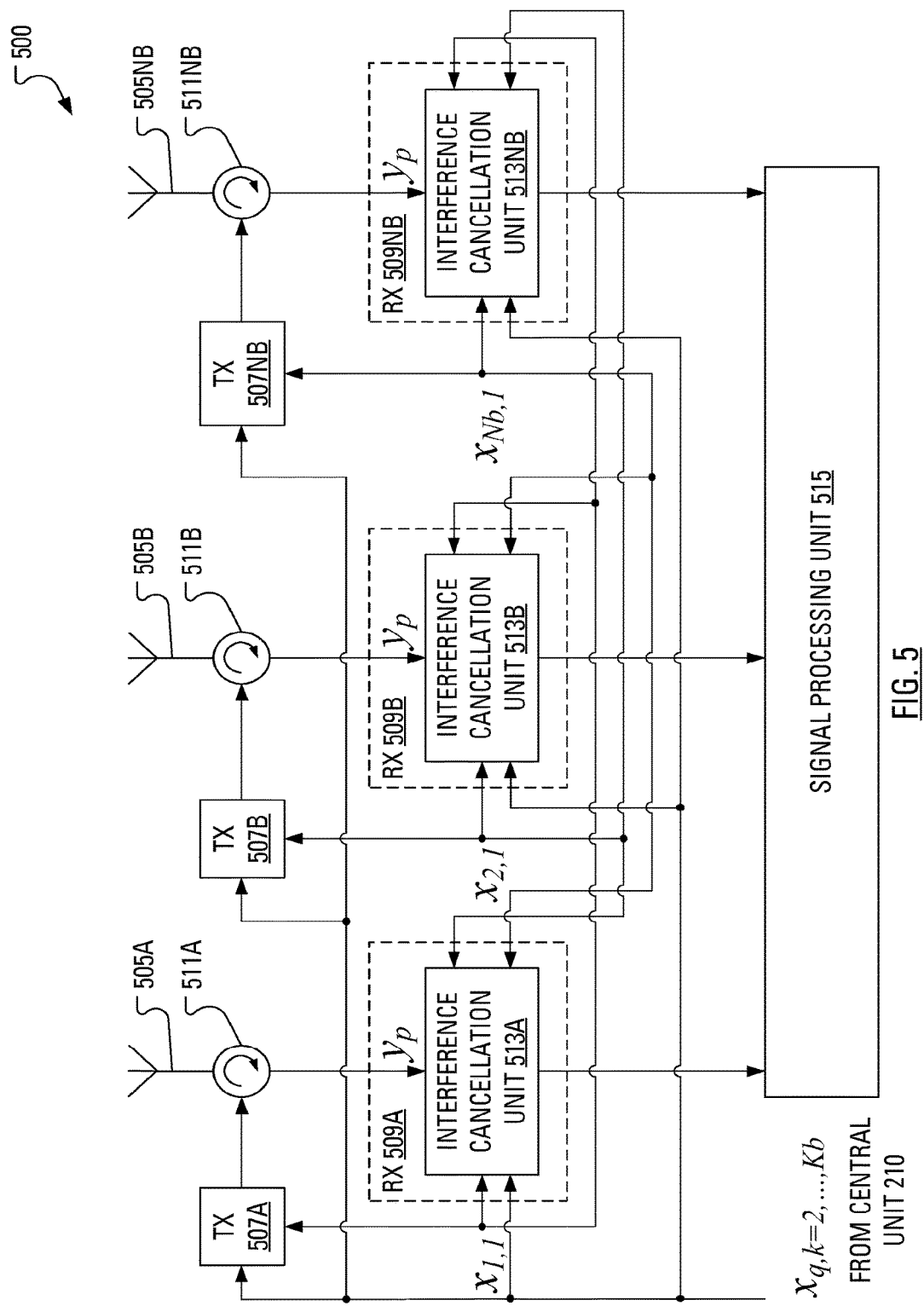
FIG. 5 illustrates an example full-duplex device including a first interference cancellation unit.

FIG. 5 illustrates an example full-duplex device 500. The full-duplex device 500 includes a plurality, $N_b$, of antennas shared by transmitters and receivers, three of which are illustrated. The antennas include a first antenna 505A, a second antenna 505B and an $N_b$th antenna 505NB (collectively or individually 505). The transmitters include a first transmitter 507A, a second transmitter 507B and an $N_b$th transmitter 507NB (collectively or individually 507). The receivers include a first receiver 509A, a second receiver 509B and an $N_b$th receiver 509NB (collectively or individually 509).

The full-duplex device 500 also includes circulators, including a first circulator 511A, a second circulator 511B and an $N_b$th circulator 511NB (collectively or individually 511). Each circulator 511 couples an antenna 505 to an associated transmitter 507 and an associated receiver 509. The self-interference at a receiver 509 may arise from different paths (commonly referred to as multipath). As an illustrative example, a transmitted signal may leak through the circulator 511 and be reflected by the antenna 505 to the receiver 509. Furthermore, other transmitted signals from nearby antennas 505 may be detected by the receiver 509 together with reflections of the transmitted signals off surrounding structures. In order to effectively remove the self-interference in the receiver 509, channel estimates (e.g., MIMO channel estimates, CIRs, and the like) from the transmitters 507 to the receiver 509 are determined so that a replica of the self-interference may be reproduced and used to cancel the self-interference at the receiver 509, for example, at an interference cancellation unit. FIG. 5 illustrates a first interference cancellation unit 513A, a second interference cancellation unit 513B and an $N_b$th interference cancellation unit 513NB (collectively or individually 513). The received signals, after interference cancellation, may be decoded by a signal processing unit 515 to recover transmitted data. Note that units 513 and 515 may be distributed in units 207 in FIG. 2 or centralized in unit 210 in FIG. 2.

Figure 6:
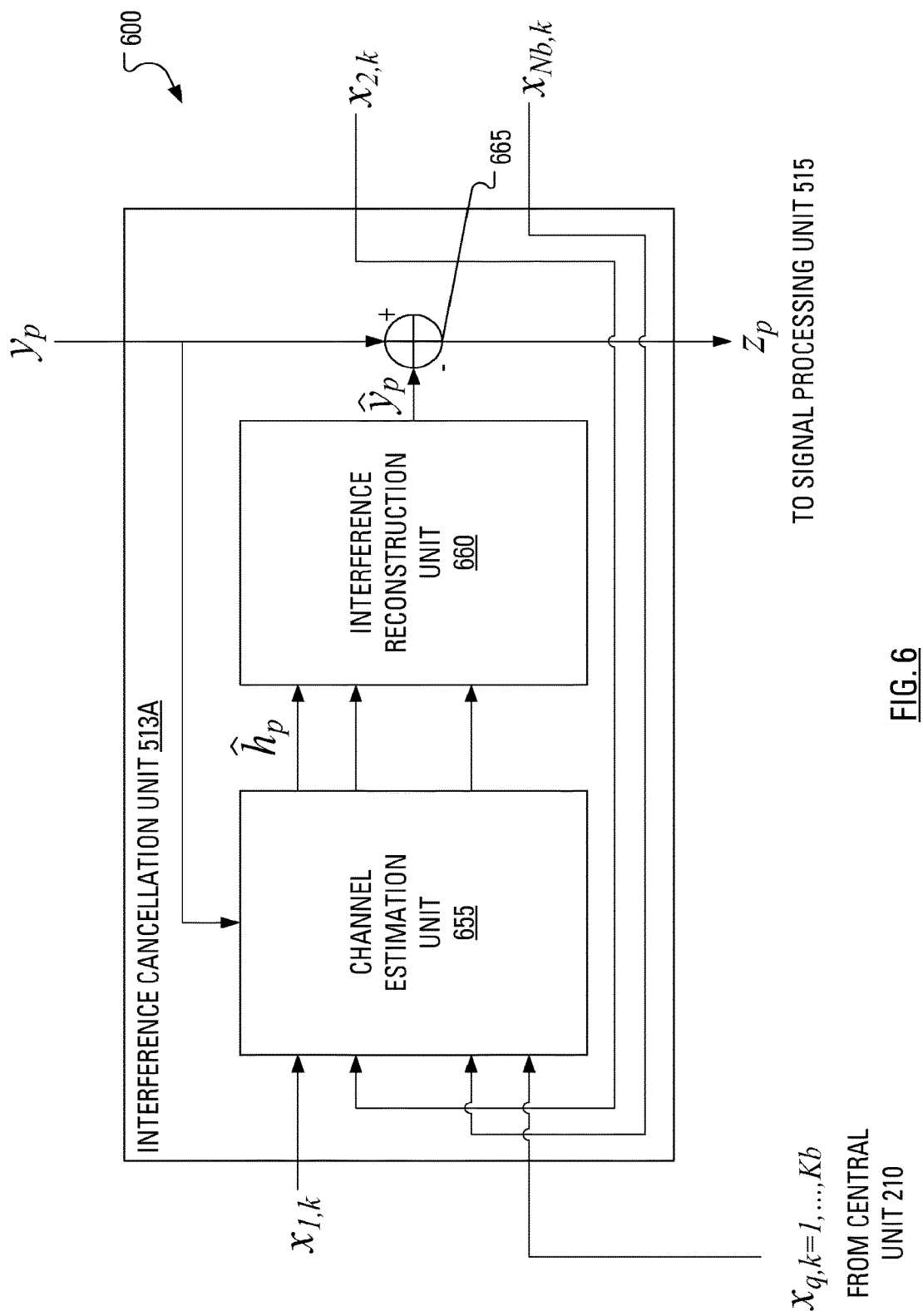
FIG. 6 illustrates example components within the first interference cancellation unit of FIG. 5.

FIG. 6 illustrates example components within the first interference cancellation unit 513A of FIG. 5. The interference cancellation unit 513A may operate in a multi-phase mode. In a first phase, the interference cancellation unit 513A may perform channel estimation, such as CIR estimation or MIMO channel estimation, using a channel estimation unit 655. Channel estimation may be performed, by the channel estimation unit 655, utilizing the transmitted pilot signals (e.g., $x_{1,k}, x_{2,k}, \ldots, x_{Nb,k}$) to allow for channel estimation. As an illustrative example, referring back to FIGS. 3 and 4, the pilot signals may be transmitted in the half-duplex GP/TP portion 459 of the first special subframe 455. In a second phase, an interference reconstruction unit 660 of the interference cancellation unit 513A may reconstruct the self-interference and the mutual interference based on known transmitted data symbols (e.g., $x_{1,k}$, $x_{2,k}$, ..., $x_{Nb,k}$) and a channel estimate (e.g., $h_p$) produced by channel estimation unit 655. A combiner 665 may combine (i.e., subtract) the interference reconstruction (as generated by an interference reconstruction unit 660) with the received signal (e.g., $y_p$) to produce an output of the combiner 665 with the interference reconstruction subtracted from the received signal.

Consider the kth base station, $BS_k$, where the number of transmit antennas is denoted by $N_k$, the number of MIMO receivers is denoted by $M_k$ and the length of the CIR for the interference from $BS_k$ is understood to be $L_k$, where k=1, 2, ..., $K_b$. A representation of the baseband signal sampled in the pth MIMO receiver, of the $M_k$ (k=0) MIMO receivers of the first $BS_1$, may be formulated by $$y_p(n) = \sum_{q=1}^{N_0} \sum_{l=0}^{L_0-1} h_{p,q,0}(l) x_{q,1}(n-l) + \sum_{q=1}^{N_1} \sum_{l=0}^{L_1-1} h_{p,q,1}(l) x_{q,2}(n-l) + \quad (1)$$

$$\ldots + \sum_{q=1}^{N_{K_b}} \sum_{l=0}^{L_{K_b}-1} h_{p,q,K_b}(l) x_{q,K_b}(n-l) + v_p(n),$$

$$p = 1, \ldots M_0$$

where $x_{q,k}(n)$ represents the transmitting pilot signal samples from the qth antenna on the kth BS. $h_{p,q,k}(l)$ represents the CIR taps from the qth antenna on the kth BS. $v_p(n)$ is the Additive White Gaussian Noise (AWGN) in the receiver. Note that the UE signal is not present in equation (1) because of the half duplex assumption for the training period. A block of N samples collected in the receiver, n=$n_0$, $n_0$+1, ..., $n_0$+N−1, can be represented as a vector, and equation (1) can be expressed in matrix form:

$$y_p = Xh_p + v_p, \quad (2)$$

where $$y_p = [y_p(n_0), y_p(n_0+1), \ldots, y_p(n_0+N-1)]^T, \quad (3)$$

$$v_p = [v_p(n_0), v_p(n_0+1), \ldots, v_p(n_0+N-1)]^T, \quad (4)$$

are both N×1 vectors, with T denoting matrix transpose. $h_p$ is a D×1 vector, with $$D = \sum_{k=1}^{K_b} N_k L_k, \quad (5)$$

representing the stacked CIR vectors from all Tx antennas on all BSs to the pth receiver's antenna. That is $$h_p = \begin{bmatrix} h_{p,1,0}^T, h_{p,2,0}^T, \ldots, h_{p,N_0,0}^T, h_{p,1,1}^T h_{p,2,1}^T, \ldots, \\ h_{p,N_1,1}^T, \ldots, h_{p,1,K_b}^T, h_{p,2,K_b}^T, \ldots, h_{p,N_{K_b},K_b}^T \end{bmatrix}, \quad (6)$$

where $h_{p,q,k}$ is an $L_k \times 1$ CIR vector from the qth antenna on the kth BS to the pth receiver:

$$h_{p,q,k} = [h_{p,q,k}(0), h_{p,q,k}(1), \ldots, h_{p,q,k}(L_k-1)]^T, q=1, \ldots N_k, k=1, \ldots K_b. \quad (7)$$

The pilot signal symbols from all Tx antennas on all BSs may be concatenated into an N×D matrix X with the form of $$X = [X_{1,1}, X_{2,1}, \ldots, X_{N_0,1} X_{1,2}, X_{2,2}, \quad (8)$$
$$\ldots, X_{N_1,2}, \ldots, X_{1,K_b}, X_{2,K_b}, \ldots, X_{N_{K_b},K_b}],$$

where $X_{q,k}$ is an N×$L_k$ channel convolution matrix with pilot signal from the qth antenna on the kth BS:

$$X_{q,k} = \begin{bmatrix} x_{q,k}(n_0) & x_{q,k}(n_0-1) & \ldots & x_{q,k}(n_0+1-L_k) \\ x_{q,k}(n_0+1) & x_{q,k}(n_0) & \ldots & x_{q,k}(n_0+2-L_k) \\ \ldots & \ldots & \ldots & \ldots \\ x_{q,k}(n_0+N-1) & x_{q,k}(n_0+N-2) & \ldots & x_{q,k}(n_0+N-L_k) \end{bmatrix}. \quad (9)$$

Then, a least-square (LS) channel estimation of $h_p$ in equation (2) may be given by $$\hat{h}_p = (X^H X)^{-1} X^H y_p. \quad (10)$$

The interference can be reconstructed at the interference reconstruction unit 660 in FIG. 6 by $$\hat{y}_p = X \hat{h}_p \quad (11)$$

such that an interference cancellation residual signal, $z_p$, is $$z_p = \hat{y}_p - y_p. \quad (12)$$

Notably, the complexity comes mostly from the channel estimation in equation (10). Let $$R_x = X^H X \quad (13)$$

be the correlation matrix of the pilot signals with dimension D×D. D in equation (5) could be large, even with some moderate parameters in the system. For example, D=1040 for $K_b$=6, $N_k$=2 and $L_k$=80 except $L_0$=40. Accordingly, a real time implementation of equation (10) may be considered difficult for reasonable processing power available in a BS. As an assist to real time implementation of equation (10), $R_x^{-1}$ may be calculated off-line and saved. However, the approach of calculating $R_x^{-1}$ off-line and then saving the calculated $R_x^{-1}$ could become problematic, as noticed in U.S. patent application Ser. No. 14/617,598, filed Feb. 9, 2015, commonly assigned and hereby incorporated herein by reference. In the present application, the design methodology in U.S. patent application Ser. No. 14/617,598 is extended from cancellation of only SI to cancellation of both SI and BS-BS IF in an FD-Net.

In general, aspects of the present application involve designing a set of pilot signals for each of the transmit antennas in the neighboring $K_b$ BSs, such that their correlation matrix of equation (13) becomes an identity matrix up to a scalar, that is $$R_x = X^H X = N \sigma_x^2 I_D, \quad (14)$$

where $\sigma_x^2 = |x_{q,k}(n)|^2$. The LS estimator would become:

$$\hat{h}_p = \frac{1}{N \sigma_x^2} X^H y_p, \quad (15)$$

which may be viewed as a set of cross-correlations between pilot signals and received samples. Specifically, the individual CIR for any pair of the transmitter and receiver antennas can be estimated independently as $$\hat{h}_{p,q,k} = \frac{1}{N\sigma_x^2} X_{q,k}^H y_p, \quad q = 1, 2, \ldots, N_k, \quad k = 1, \ldots K_b \quad (16)$$

where $\hat{h}_{p,q,k}$ is in the same form as $h_{p,q,k}$ in equation (7) and $X_{q,k}$ is the channel convolution matrix in equation (9). The condition, the correlation matrix becoming an identity matrix—see equation (14), that allows equations (15) and (16) to be realized, is equivalent to conditions for the correlation matrix of a pair of pilot signals on two Tx antennas:

$$X_{q_1,k_1}^H X_{q_2,k_2} = \begin{cases} N\sigma_x^2 I_{L_{k_1}}, & q_1 = q_2 \text{ and } k_1 = k_2 \\ 0_{L_{k_1} \times L_{k_2}}, & \text{otherwise} \end{cases} \quad (17)$$

$$q_1 \in \{1, 2, \ldots, N_{k_1}\}, q_2 \in \{1, 2, \ldots, N_{k_2}\},$$

$$k_1, k_2 \in \{1, 2, \ldots, K_b\}.$$

From equation (17), it can be noted that one consequence of the pilot signals being orthogonal is that the autocorrelations of all of the pilot signals is ideal (i.e., a Dirac delta function $\delta(\tau)$) with all lags $|\tau| \leq L_m - 1$. Another consequence of the pilot signals being orthogonal is that the cross-correlation between pilot signals is all zeros over the same lag interval, where $L_m = \max_{k \in [0, K_b]} L_k$. Such a set of orthogonal pilot signals can be built upon the general zero-correlation-zone (ZCZ) sequences and cyclic prefix (CP). For details of ZCZ sequences and design examples, one may refer to U.S. patent application Ser. No. 14/617,598 and references therein.

In the following, a set of ZCZ sequences is constructed with the sequence length being equal to N, the zone size being no less than $L_m - 1$ and the set size being at least $N_b$, the total number of Tx antennas from all neighbouring cells:

$$N_b = \sum_{k=0}^{K_b} N_k. \quad (18)$$

If we let the constructed ZCZ sequence set be indexed as $$\delta = \{s_{q,k}(0), s_{q,k}(1), \ldots, s_{q,k}(N-1)\}, q=1,2,\ldots, \\ N_k, k=1, \ldots K_b \quad (19)$$

then the pilot signal transmitted from the qth antenna on the kth BS would be a $(N+N_{CP}) \times 1$ vector $$x_{q,k} = \begin{bmatrix} s_{q,k}(N-N_{CP}), s_{q,k}(N-N_{CP}+1), \ldots, s_{q,k}(N-1), \\ s_{q,k}(0), s_{q,k}(1), \ldots, s_{q,k}(N-1) \end{bmatrix}^T, \quad (20)$$

where each of the first $N_{CP}$ symbols are a cyclic prefix (CP) copied from the end of the original ZCZ sequence. Notably, a condition that $N_{CP} \geq L_m - 1$ is to be met to allow the orthogonality to be maintained over the delay spread in equation (17). The CP should also cover the propagation delay from neighboring $BS_k$ to $BS_1$, as will be discussed hereinafter. It should also be noted that the CP length should cover the multipath spread and propagation delay of mutual interference between BSs. Furthermore, the CP length need not, necessarily, match the normal or extended CP length specified in the LTE standard.

Selection of pilot signals for a full-duplex communications system begins with the device selecting a set of signals that meet communications system requirements. The set of signals may, for one example, meet the condition as expressed in equation (14), as well as in equation (17). As an example, a ZCZ sequence may be selected and the ZCZ sequence selected may meet conditions as set in equations (14) and (17). The same ZCZ sequence may, for example, be selected to meet other communications system requirements, such as: the length of the ZCZ sequence being equal to the desired symbol length N (before cyclic prefix being added); the size of the ZCZ sequences set being equal to or greater than the number of transmit antennas $N_b$; and the ZCZ sequence zone length being equal to or greater than the channel delay spread $L_b$ which may dictate a minimum ZCZ-zone length for auto- and cross-correlations of the sequences in the ZCZ sequence set; and the like. The device may save the ZCZ sequence. The ZCZ sequence (or information about the ZCZ sequence, which may be sufficient to generate a duplicate of the ZCZ sequence) may be saved to a local memory, a remote memory, a local database, a remote database, a local server, a remote server, or the like.

Figure 7:
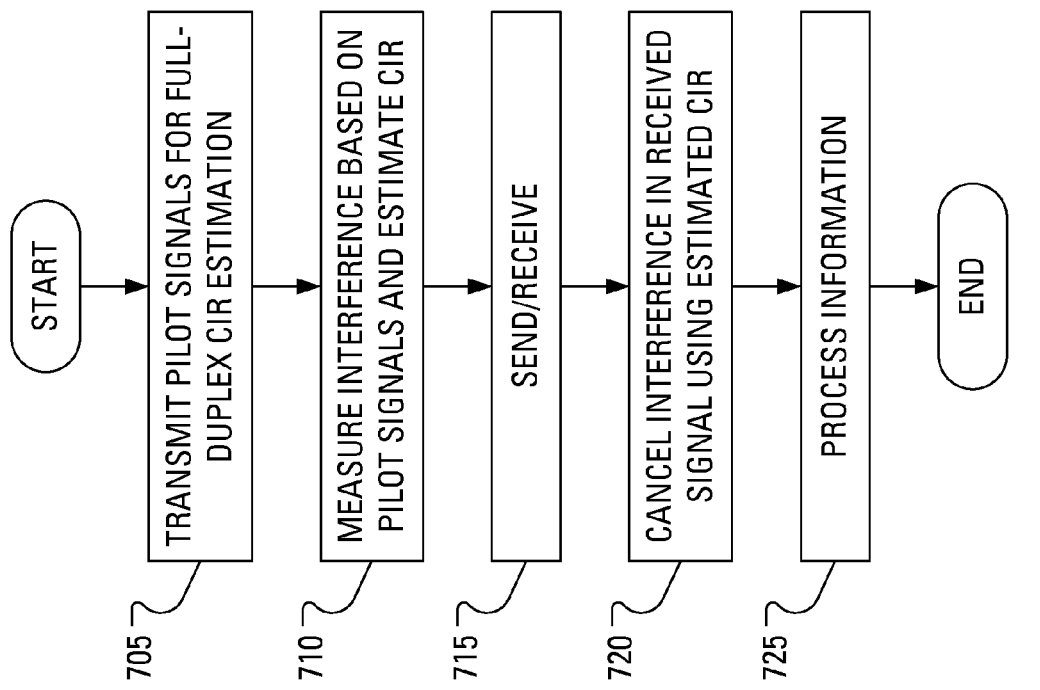
FIG. 7 illustrates example steps in a method carried out at a device to cancel interference while operating in full-duplex mode.

FIG. 7 illustrates a flow diagram of example steps in a method carried out at a device operating in full-duplex mode. The steps may be indicative of operations occurring at a device, such as a BS capable of full-duplex operation or a full-duplex UE, as the device operates in full-duplex mode.

The method of FIG. 7 may begin with the device transmitting pilot signals for full-duplex CIR estimation (step 705). The pilot signals may be a ZCZ sequence or any other type of signal satisfying equation (14) selected, for example, according to the method of FIG. 7, for meeting communications system requirements. That is, the pilot signal may be configured to allow for an estimation of a CIR for a communications channel between transmit antennas of the $K_b$ BSs and a receive antenna of the device.

The pilot signals may, for example, be selected by the device, specified by a technical standard, or selected by an operator of the communications system. The device may measure (step 710) interference in accordance with the pilot signals. Additionally, as part of step 710, the device may also estimate the CIRs of the communication channels. The device may then send and receive (step 715) signals. The signals sent in step 715 may be signals corresponding to a first transmission. The signals received in step 715 may include signals corresponding to the first transmission, self-interference (SI) arising from further transmissions made by the transmit antennas of the device and mutual interference (BS-BS IF) arising from further transmissions made by the transmit antennas of the other BSs. The device may cancel (step 720) interference (at least some of the SI and at least some of the BS-BS IF) present in the received signals by using the estimated CIRs. The device may then process (step 725) information contained in the received signals after the interference cancellation. As will be well understood by the person of ordinary skill in the art, such processing (step 725) of the information contained in the received signals may include demodulation and decoding.

The least-square channel estimation of $h_p$ given in equations (10) and (15) may be subject to estimation errors, for example due to observation noise in equation (1). In general, such estimation errors may be included in the channel estimation explicitly by using the expression $$\hat{h}_p = h_p + \Delta h_p, \quad (21)$$

where $\Delta h_p$ is representative of estimation error and can be considered to be normally distributed with a zero mean and certain variance. The variance of the LS estimation of equation (10) reaches the Cramér-Rao lower bound (CRLB) when the observation noise $v_p(n)$ is AWGN. It can be shown that the CRLB may be found as the diagonal elements of the covariance matrix $$C_{\Delta h} = E\{\Delta h_p \Delta h_p^H\} = \sigma_v^2 (X^H X)^{-1}, \quad (22)$$

where $\sigma_v^2$ is the variance of the observation noise $v_p(n)$ in the receiver. For the proposed orthogonal pilots satisfying equation (14), we have $$C_{\Delta h} = \frac{\sigma_v^2}{N\sigma_x^2} I_D. \quad (23)$$

Accordingly, the cancellation residual of equation (12) may be rewritten as $$z_p = \hat{y}_p - y_p = \varepsilon_p - v_p, \quad (24)$$

where $$\varepsilon_p = X\Delta h_p \quad (25)$$

is the additional noise in the cancellation residual due to channel estimation errors. The average power of the additional noise, $P_\varepsilon$, can be evaluated by $$P_\varepsilon = \frac{1}{N} E\{\varepsilon_p^H \varepsilon_p\} = \sigma_x^2 E\{\Delta h_p^H \Delta h_p\} = \sigma_x^2 Tr(C_{\Delta h}) = \frac{D}{N}\sigma_v^2, \quad (26)$$

where Tr(.) denotes the trace of a matrix. D has been defined in equation (5) and N is the length of the observation window for channel estimation. The power of the total cancellation residual of equation (24) is $$P_z = P_\varepsilon + \sigma_v^2 = \left(\frac{D}{N} + 1\right)\sigma_v^2 \quad (27)$$

It is suggested by equation (26) that the cancellation noise due to channel estimation errors or, equivalently, due to reconstruction errors in this case, can be reduced to a level below the observation noise provided that D<N. For the example of D=1040 used above, a reasonable choice of N=2D=2080, which is about the duration of an Orthogonal Frequency Division Multiplexing (OFDM) symbol in LTE, would have additional noise that is 3 dB below the observation noise but raise the overall cancellation residual 1.76 dB above the original observation noise.

One of the advantages of using orthogonal pilot signals that satisfy equation (17) is that only one shared HD training period is employed for completing the training for all the $K_b$ BSs involved in the interference cancellation setup that is represented in equation (1).

Figure 8:
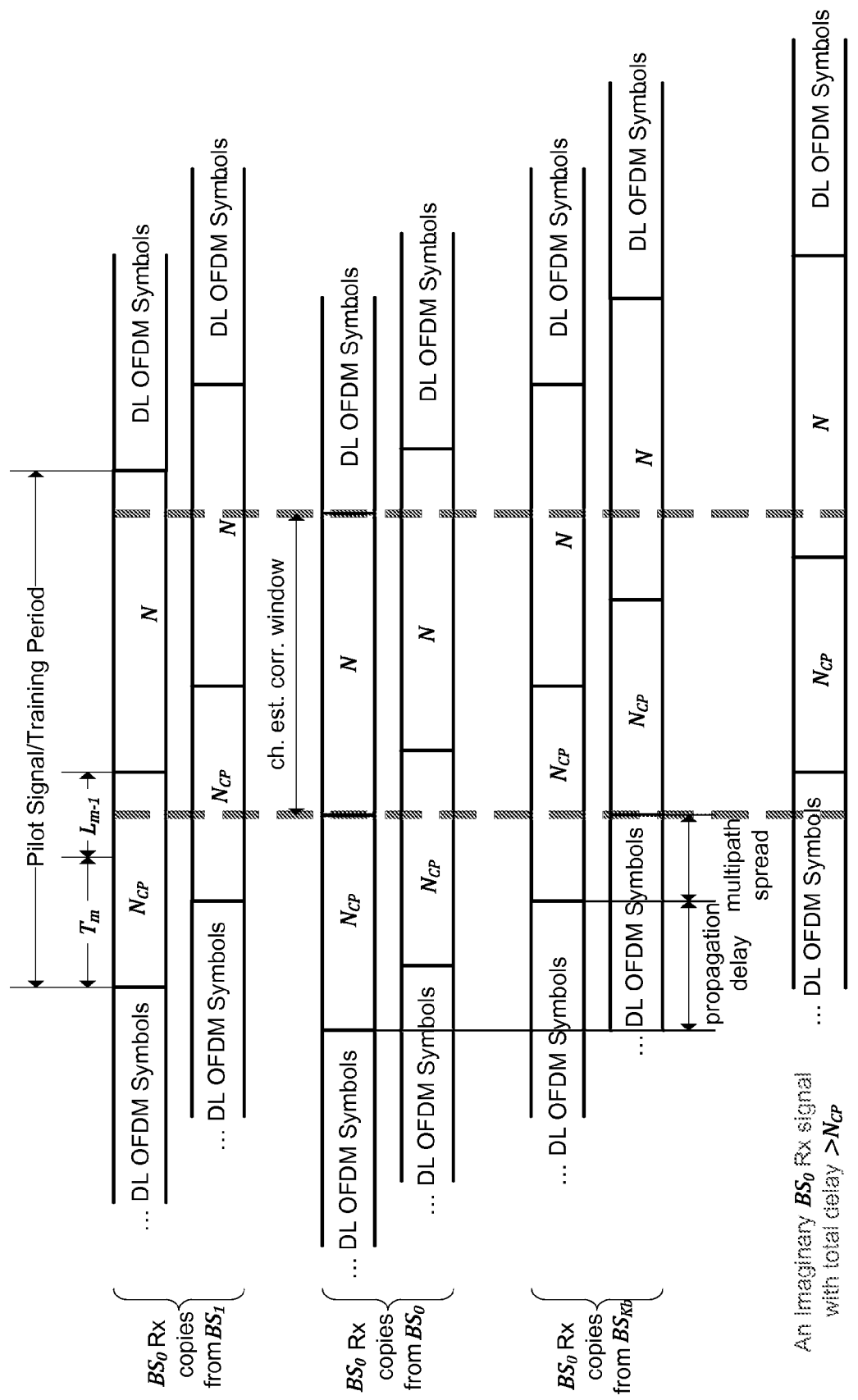
FIG. 8 illustrates training periods with length to cover both propagation delay and multipath spread.

Given the variation in propagation paths among SI ($BS_0$ to $BS_0$) and mutual interferences ($BS_k$ to $BS_1$, k=2 ... $K_b$), the CP of the pilot signal of equation (20) may be extended to reduce a likelihood that the regular DL signals, received from other BSs at $BS_0$, interfere with the pilot signals in the correlation window for channel estimation. That is, the minimum CP length for the pilot signal in equation (20) should be $N_{CP}=L_m+T_m-1$, where $T_m$, is the number of samples corresponding the maximum propagation delay from the farthest BS to $BS_0$. Therefore, the minimum length of the training period should be N+$L_m$+$T_m$−1. An example is illustrated in FIG. 8, where, at the $BS_0$, Rx signals from $BS_1$ and $BS_{K_b}$ are considered to have total delays (propagation delay plus multipath delay)≤$N_{CP}$ and an imaginary Rx signal is expected to have a total delay>$N_{CP}$ such that the preceding DL signal intrudes into the channel estimation window and invalidates the orthogonal conditions (17) for pilot signals.

The training period can be, in general, allocated in any of the downlink slots where no control signals such CRS, PSS, SSS, PBCH, PDCCH, PCFICH and PHICH are scheduled. An efficient, and less intrusive, allocation of the training period is proposed in U.S. patent application Ser. No. 14/617,679. In U.S. patent application Ser. No. 14/617,679, the training period is suggested to be shared with the Guard Period (GP) for the LTE-TDD system. The allocation of a training period over the GP and part of the DwPTS is exemplified in FIG. 9 (called an extended TP 925).

Figure 9:
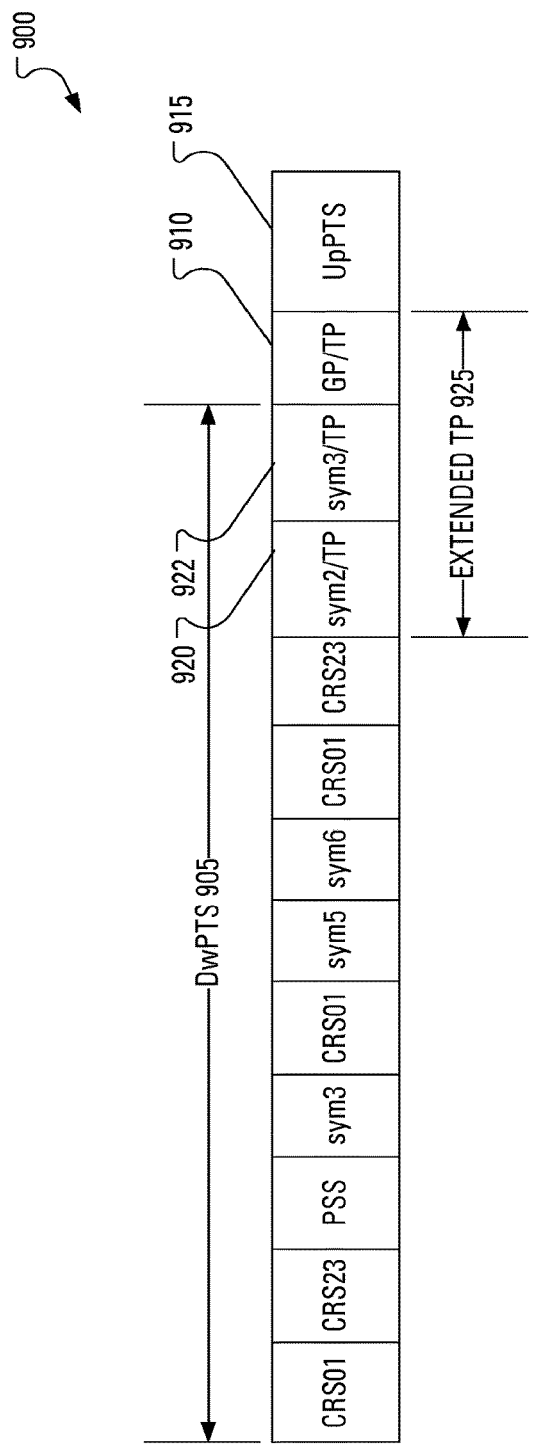
FIG. 9 illustrates allocation of a training period over parts of a first example of the special subframe illustrated in FIG. 4.

FIG. 9 illustrates an example special subframe 900 with an extended half-duplex pilot signal. The special subframe 900 includes a DwPTS portion 905, a GP/TP portion 910 and an UpPTS portion 915. In situations where a longer pilot signal is warranted, but legacy compatibility is needed, a subset of DwPTS portion 605 may be reserved by a scheduler and used to carry the pilot signal. As shown in FIG. 9, a part of the DwPTS portion 905 (a sym2/TP portion 920 and a sym3/TP portion 922) may be used to carry the pilot signal, yielding the extended TP 925. Furthermore, in frames with multiple special subframes, all of the special subframes may have extended TPs, a subset of the special subframes may have extended TPs, or none of the special subframes may have extended TPs.

Figure 10:
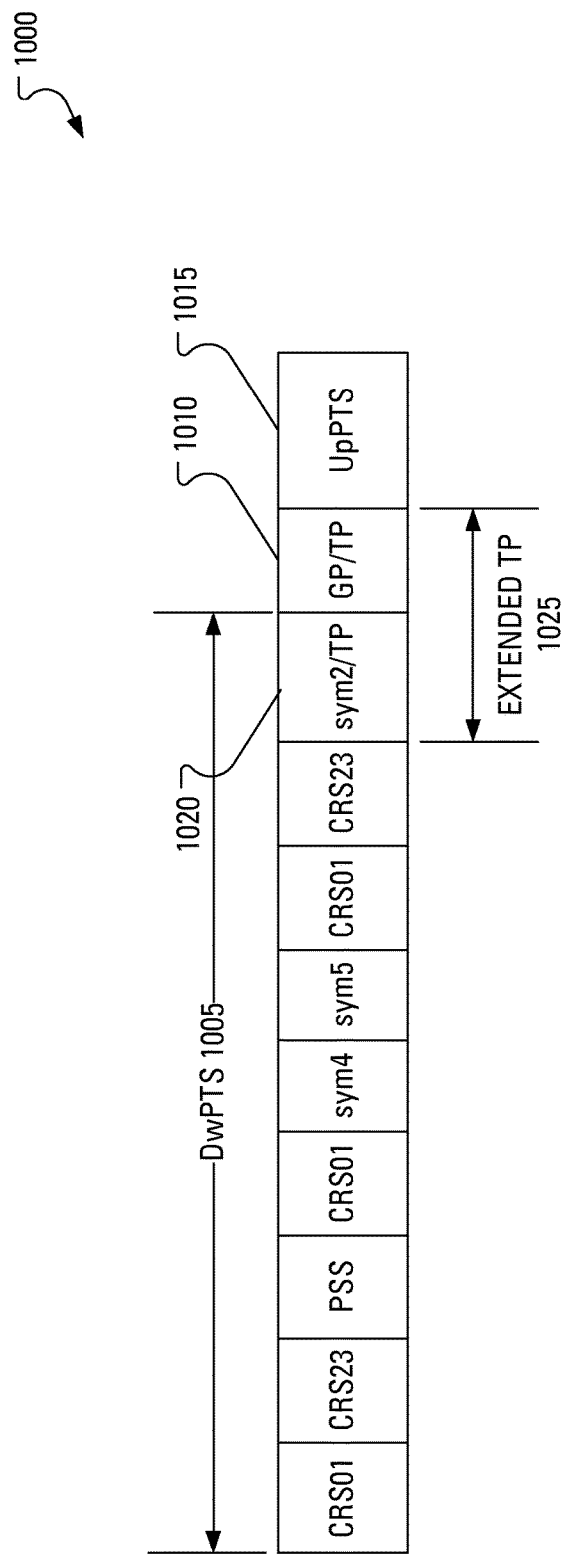
FIG. 10 illustrates allocation of a training period over parts of a first example of the special subframe illustrated in FIG. 4.

In the example special subframe 900 of FIG. 9, the extended TP 925 is shared with the GP/TP portion 910 and extended to two OFDM symbols (the sym2/TP portion 920 and the sym3/TP portion 922) in the DwPTS portion 905. An example special subframe 1000 is illustrated in FIG. 10. The example special subframe 1000 illustrated in FIG. 10 includes a DwPTS portion 1005, a GP/TP portion 1010 and a UpPTS portion 1015. An extended TP 1025 is shared with the GP/TP portion 1010 and extended to only one OFDM symbol (the sym2/TP portion 1020) in the DwPTS portion 1005. Differences between the DwPTS portion 905 in FIG. 9 and the DwPTS portion 1005 in FIG. 10 may be familiar to those knowledgeable about special subframe configurations within the LTE TDD standard.

A selection process may be employed to select the most strongly interfering BSs from the neighboring cells. The selection process can be adaptive and, additionally, may be tailored to complexity and performance specific to a network. In one embodiment, the selection of strongest interfering BSs can be based on the individual channel estimation from (16), which is possible due to the orthogonality of the pilot signals. The interference level from each BS, and even from each Tx antenna of each BS, can be calculated by energy of the CIR, $\hat{h}_{p,q,k}$, estimated for the qth antenna and kth BS in the network. That is, the selection of "strongest interfering BS" may be the BS with the antenna generating the strongest interference. Alternatively, the "strongest interfering BS" may be the BS with the most total interference, with contributions from many antennas. Consequently, the number of antennas $N_k$ selected for cancellation in the kth BS may be less than the number of physical antennas in the kth BS.

The solution provided herein may be applied to those networks for which there is a mechanism for sharing transmission information among a set of BSs involved in the interference cancellation (see FIG. 2).

A C-RAN based FD-Net can implement aspects of the present invention in a centralized unit (CU) because the transmission information can be readily available at the CU and the interference cancellation can be done digitally in a centralized baseband unit (C-BBU). Aspects of the present application can be implemented at remote radio units (RRUs) simultaneously for hybrid analog and digital interference cancellation in RRUs where the required transmission plus channel information, or the reconstructed copies of the interference, can be passed from CU to RRUs with proper timing advance. One of the advantages of two-stage hybrid analog/digital and digital cancellation in RRUs and C-BBU is that an improved dynamic range can be achieved for both the interference residual and uplink signal.

Aspects of the present application are, in principle, applicable to the cancellation of UE-UE IF, as shown in FIG. 2, in a HD-UE or an FD-UE. The sharing of transmission information between UEs can be accomplished by communication links between the UEs. Such communication links may be realized using various technologies, such as WiFi (defined in the 802.11 standards published by the Institute for Electrical and Electronics Engineers), Bluetooth™, Near Field Communication (NFC), etc. The capability for such communication links is widely available in smart UEs. Since the uplink transmission is controlled by the BS, a dedicated training period can be scheduled for a group of UEs involved in interference cancellation setup that can be formulated in a manner consistent with equations (1) to (14).

Although aspects of the present application have been elaborated for applications in LTE networks, such aspects can be equally suited for other applications, such as for FD-WiFi networks, where the cancellation of Access Point to Access Point Interference (AP-AP IF) and Station to Station Interference (STA-STA IF) can be handled in a manner consistent with aspects of the present application, provided that that suitable infrastructure is either available or can be constructed, for example, in a manner consistent with the FD-Net shown in FIG. 2.

Figure 11:
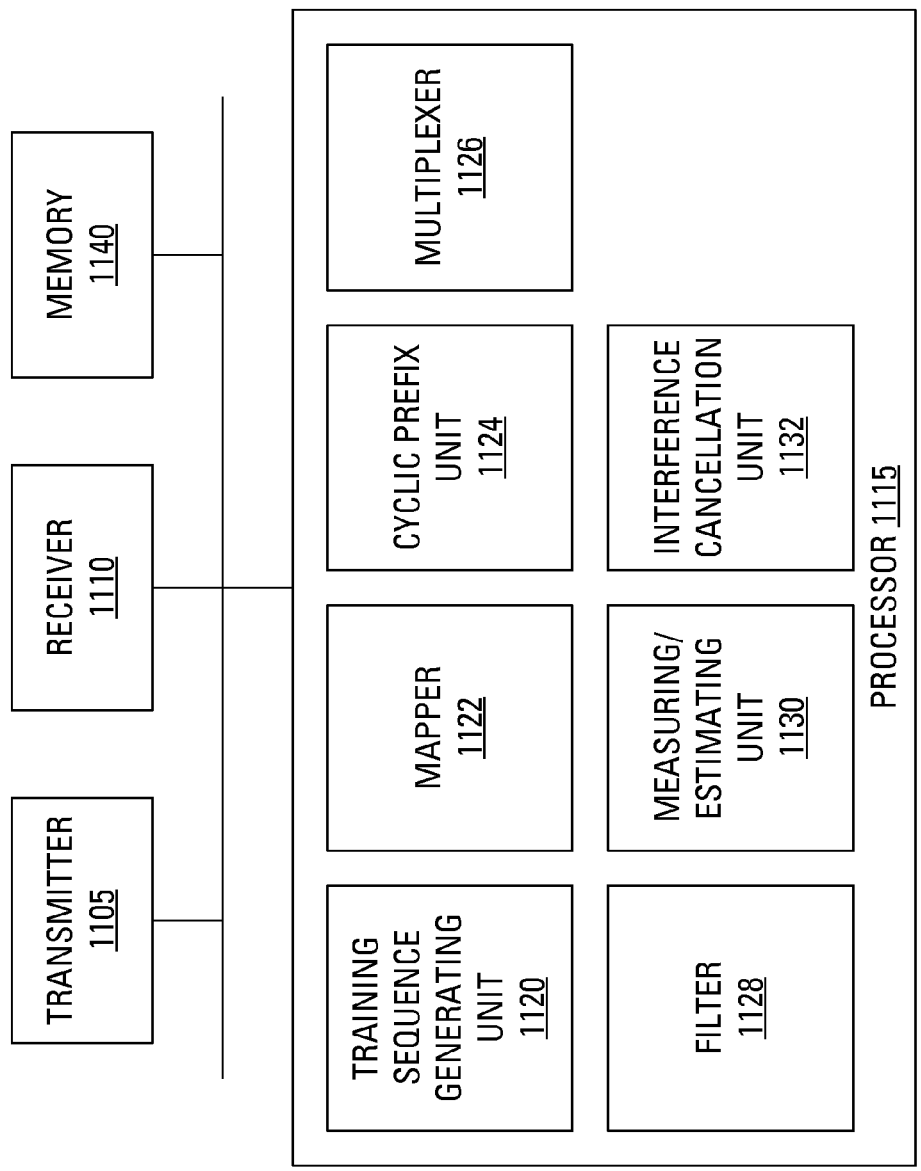
FIG. 11 illustrates elements of an example communications device.

FIG. 11 illustrates elements of an example communications device 1100. The communications device 1100 may be an implementation of a full-duplex device, such as a full-duplex BS or a full-duplex UE. The communications device 1100 may be used to implement various ones of the embodiments discussed herein. As shown in FIG. 11, a transmitter 1105 may be configured to transmit frames, pilot signals, and the like. The communications device 1100 includes a receiver 1110 that may be configured to receive frames, pilot signals, and the like. Other conventional units, such as encoder, decoder, modulator and demodulator used in the transmitter and the receiver, are not shown here for succinctness.

A training sequence generating unit 1120 may be configured to generate training sequences used in CIR estimation. Training sequence generating unit 1120 may be configured to generate training sequences from ZCZ sequences or any other type of sequences satisfying the condition expressed in equation (14). The training sequence generating unit 1120 may be configured to generate training sequences that meet communications system requirements. A mapper 1122 may be configured to map the training sequence to transmit antenna ports. The mapper 1122 may be configured to select a training sequence from the training sequences for each transmit antenna. A cyclic prefix unit 1124, if necessary, may be configured to add a cyclic prefix to the selected training sequences to produce extended sequences, or to remove the cyclic prefix from the received signals. A multiplexer 1126 may be configured to multiplex the extended sequences with data symbols. A filter 1128 may be configured to filter the multiplex symbols, to ensure that the symbols meet spectral requirements, for example. A measuring/estimating unit 1130 may be configured to measure a channel. Measuring/estimating unit 1130 may be configured to measure the channel in accordance with pilot signals. The measuring/estimating unit 1130 may be configured to estimate CIR of the channel based on the measurement of the channel. An interference cancellation unit 1132 may be configured to cancel interference (self-interference and mutual interference) from received signals. The interference cancellation unit 1132 may be configured to reconstruct interference from known transmitted data and the estimated CIRs. The reconstructed interference may then be subtracted from the received signal to generate an interference cancellation residual signal. A memory 1140 may be configured to store training sequences, received signals, channel measurements, CIR estimates, reconstructed interference, interference cancellation residual signals, and the like.

The elements of communications device 1100 may be implemented as specific hardware logic blocks. In an alternative, the elements of communications device 1100 may be implemented as software executing in a processor, controller, application specific integrated circuit, or the like. In yet another alternative, the elements of communications device 1100 may be implemented as a combination of software and hardware.

As an example, receiver 1110 and transmitter 1105 may be implemented as a specific hardware block, while the training sequence generating unit 1120, the mapper 1122, the cyclic prefix unit 1124, the multiplexer 1126, the filter 1128, the measuring/estimating unit 1130, and the interference cancellation unit 1132 may be software modules executing in a microprocessor (such as a processor 1115) or a custom circuit or a custom compiled logic array of a field programmable logic array. The training sequence generating unit 1120, the mapper 1122, the cyclic prefix unit 1124, the multiplexer 1126, the filter 1128, the measuring/estimating unit 1130, and the interference cancellation unit 1132 may be modules stored in the memory 1140.

Through the descriptions of the preceding embodiments, aspects of the present application may be implemented by using hardware only or by using software and a universal hardware platform. Based on such understandings, the technical solution of aspects of the present application may be embodied in the form of a software product. The software product may be stored in a non-volatile, non-transitory software medium, which can be a compact disk read-only memory (CD-ROM), USB flash disk, or a removable hard disk. The software product includes a number of instructions that enable a computer device (personal computer, server, or network device) to execute the methods provided in the aspects of the present application.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims and are contemplated to cover any and all modifications, variations, combinations or equivalents that fall within the scope of the present invention.

What is claimed is:

1. A method of operating a device in a full-duplex network, the method comprising:
    transmitting, by a transmit antenna of the device, a first pilot signal selected from a plurality of mutually orthogonal pilot signals;
    receiving, by a receive antenna of the device, a first received signal and a second received signal, the first received signal including the first pilot signal and a second pilot signal selected from the plurality of mutually orthogonal pilot signals, the second pilot signal transmitted by a transmit antenna of a distinct device, and the second received signal including transmitted data;
    estimating, by the device based on the first pilot signal, a first channel impulse response (CIR) for a communications channel between the transmit antenna and the receive antenna;
    estimating, by the device based on the second pilot signal, a second CIR for a communication channel between the transmit antenna of the distinct device and the receive antenna;
    cancelling, by the device, a self-interference component in the second received signal, the self-interference component being determined by the device using the first CIR; and
    cancelling, by the device, a mutual-interference component in the second received signal, the mutual-interference component being determined by the device using the second CIR.

2. The method of claim 1 further comprising selecting the plurality of mutually orthogonal pilot signals based on sequences that have a cross-correlation matrix that is an identity matrix.

3. The method of claim 2 wherein the sequences comprise zero-correlation-zone sequences.

4. The method of claim 1 wherein the transmitting the first pilot signal comprises transmitting the first pilot signal in a special subframe of a full-duplex subframe structure, the special subframe comprising a downlink portion, a half-duplex guard period (GP) portion and an uplink portion.

5. The method of claim 4 wherein the transmitting the first pilot signal comprises transmitting the first pilot signal in an extended half-duplex training portion of the special subframe.

6. The method of claim 5 wherein the extended training portion comprises a symbol in the downlink portion of the special subframe.

7. The method of claim 5 wherein the extended training portion comprises the GP portion of the special subframe.

8. The method of claim 1 further comprising:
    reconstructing the self-interference component of the second received signal using the first CIR and data transmitted at the transmit antenna and cancelling the self-interference component in the second received signal by subtracting the self-interference component from the second received signal; and
    reconstructing the mutual-interference component of the second received signal using the second CIR and data transmitted at the distinct device and cancelling the mutual-interference component in the second received signal by subtracting the mutual-interference component from the second received signal.

9. A method of operating a device, the method comprising:
    transmitting, by a first transmit antenna of the device and a second transmit antenna of the device, a first pilot signal and a second pilot signal, respectively, the first and second pilot signals being selected from a plurality of mutually orthogonal pilot signals;
    receiving, by a receive antenna of the device, a first received signal and a second received signal, the first received signal including the first pilot signal, the second pilot signal and a third pilot signal selected from the plurality of mutually orthogonal pilot signals, the third pilot signal transmitted by a transmit antenna of a distinct device, and the second received signal including transmitted data;
    estimating, by the device based on the first pilot signal, a first channel impulse response (CIR) for a communications channel between the first transmit antenna and the receive antenna;
    estimating, by the device based on the second pilot signal, a second CIR for a communication channel between the second transmit antenna and the receive antenna;
    estimating, by the device based on the third received signal, a third CIR for a communication channel between the transmit antenna of the distinct device and the receive antenna;
    cancelling, by the device, a self-interference component in the second received signal, the self-interference component being determined by the device using the first CIR together with data transmitted at the first transmit antenna, and also using the second CIR together with data transmitted at the second transmit antenna; and
    cancelling, by the device, a mutual-interference component in the second received signal, the mutual-interference component being determined by the device using the third CIR together with data transmitted by the distinct device.

10. A device operating in a full-duplex network, the device comprising:
    a receive antenna;
    a transmit antenna;
    a transmitter configured to transmit, via the transmit antenna, a first pilot signal selected from a plurality of pilot signals;
    a processor;
    a receiver operatively coupled to the processor, the receiver configured to receive a first received signal and a second received signal, the first received signal including the first pilot signal and a second pilot signal selected from the plurality of mutually orthogonal pilot signals, the second pilot signal transmitted by a transmit antenna of a distinct device, and the second received signal including transmitted data; and
    the processor configured to:
        estimate, based on the first pilot signal, a first channel impulse response (CIR) for a communications channel between the transmit antenna and the receive antenna;
        estimate, based on the second pilot signal, a second CIR for a communications channel between the transmit antenna of the distinct device and the receive antenna;
        cancel a self-interference component in the second received signal, the self-interference component being determined by the device using the first CIR; and
        cancel a mutual-interference component in the second received signal, the mutual-interference component being determined by the device using the second CIR.

11. The device of claim 10 wherein the processor is further adapted to select the plurality of mutually orthogonal pilot signals based on sequences that have a cross-correlation matrix that is an identity matrix.

12. The device of claim 11 wherein the sequences comprise zero-correlation-zone sequences.

13. The device of claim 10 wherein the processor is further adapted to transmit the first pilot signal in a special subframe of a full-duplex subframe structure, the special subframe comprising a downlink portion, a half-duplex guard period (GP) portion and an uplink portion.

14. The device of claim 13 wherein the processor is further adapted to transmit the first pilot in an extended half-duplex training portion of the special subframe.

15. The device of claim 14 wherein the extended training portion comprises a symbol in the downlink portion of the special subframe.

16. The device of claim 14 wherein the extended training portion comprises the GP portion of the special subframe.

17. The device of claim 10 wherein the processor is further configured to:
reconstruct the self-interference component of the second received signal using the first CIR and data transmitted at the transmit antenna and cancel the self-interference component in the second received signal by subtracting the self-interference component from the second received signal; and
reconstruct the mutual-interference component of the second received signal using the second CIR and data transmitted at the distinct device and cancel the mutual-interference component in the second received signal by subtracting the mutual-interference component from the second received signal.

18. A non-transitory computer readable medium for storing instructions that, when executed by a processor in a device operating in a full-duplex network, cause the processor to:
transmit, from a transmit antenna at the device, a first pilot signal selected from a plurality of mutually orthogonal pilot signals;
receive a first received signal and a second received signal, the first received signal including the first pilot signal and a second pilot signal selected from the plurality of mutually orthogonal pilot signals, the second pilot signal transmitted by a transmit antenna of a distinct device, and the second received signal including transmitted data;
estimate, based on the first pilot signal, a first channel impulse response (CIR) for a communications channel between the transmit antenna and the receive antenna;
estimate, based on the second pilot signal, a second CIR for a communications channel between the transmit antenna of the distinct device and the receive antenna;
cancel a self-interference component in the second received signal, the self-interference component being determined by the device using the first CIR; and
cancel a mutual-interference component in the second received signal, the mutual-interference component being determined by the device using the second CIR.

19. The non-transitory computer readable medium of claim 18 wherein the instructions further cause the processor to select the plurality of mutually orthogonal pilot signals based on sequences that have a cross-correlation matrix that is an identity matrix.

20. The non-transitory computer readable medium of claim 18 wherein the instructions further cause the processor to:
reconstruct the self-interference component of the second received signal using the first CIR and data transmitted at the transmit antenna and cancel the self-interference component in the second received signal by subtracting the self-interference component from the second received signal; and
reconstruct the mutual-interference component of the second received signal using the distinct CIR and data transmitted at the distinct device and cancel the mutual-interference component in the second received signal by subtracting the mutual-interference component from the second received signal.

21. The method of claim 9, further comprising:
determining self-interference components of a further received signal, basing the determining on:
the first CIR and data transmitted at the first transmit antenna; and
the second CIR and data transmitted at the second transmit antenna.

22. A device comprising:
a receive antenna;
a first transmit antenna and a second transmit antenna;
a transmitter configured to transmit, via the first transmit antenna and the second transmit antenna, a first pilot signal and a second pilot signal, respectively, the first and second pilot signals being selected from a plurality of pilot signals;
a processor;
a receiver operatively coupled to the processor, the receiver configured to:
receive a first received signal and a second received signal, the first received signal including the first pilot signal, the second pilot signal and a third pilot signal selected from the plurality of mutually orthogonal pilot signals, the third pilot signal transmitted by a transmit antenna of a distinct device, and the second received signal including transmitted data; and
the processor configured to:
estimate, based on the first pilot signal, a first channel impulse response (CIR) for a communications channel between the first transmit antenna and the receive antenna;
estimate, based on the second pilot signal, a second CIR for a communications channel between the second transmit antenna and the receive antenna;
estimate, based on the third pilot signal, a third CIR for a communication channel between the transmit antenna of the distinct device and the receive antenna;
cancel a self-interference component in the second received signal, the self-interference component being determined by the device using the first CIR together with data transmitted at the first transmit antenna, and also using the second CIR together with data transmitted at the second transmit antenna; and
cancel a mutual-interference component in the second received signal, the mutual-interference component being determined by the device using the third CIR together with data transmitted by the distinct device.

23. The device of claim 22, wherein the processor is further configured to:
determine self-interference components of a further received signal, basing the determining on:
the first CIR and data transmitted at the first transmit antenna; and
the second CIR and data transmitted at the second transmit antenna.

24. A non-transitory computer readable medium for storing instruction that, when executed by a processor in a device, cause the processor to:

transmit, from a first transmit antenna at the device and a second transmit antenna of the device, a first pilot signal and a second pilot signal, respectively, the first and second pilot signals being selected from a plurality of mutually orthogonal pilot signals;

receive a first received signal and a second received signal, the first received signal including the first pilot signal, the second pilot signal and a third pilot signal selected from the plurality of mutually orthogonal pilot signals, the third pilot signal transmitted by a transmit antenna of a distinct device, and the second received signal including transmitted data;

estimate, based on the first pilot signal, a first channel impulse response (CIR) for a communications channel between the first transmit antenna and the receive antenna;

estimate, based on the second pilot signal, a second CIR for a communications channel between the second transmit antenna and the receive antenna;

estimate, based on the third pilot signal, a third CIR for a communication channel between the transmit antenna of the distinct device and the receive antenna;

cancel a self-interference component in the second received signal, the self-interference component being determined by the device using the first CIR together with data transmitted at the first transmit antenna, and also using the second CIR together with data transmitted at the second transmit antenna; and cancel a mutual-interference component in the second received signal, the mutual-interference component being determined by the device using the third CIR together with data transmitted by the distinct device.

25. The non-transitory computer readable medium of claim 24, wherein the instructions further cause the processor to:

determine self-interference components of a further received signal, basing the determining on:
the first CIR and data transmitted at the first transmit antenna; and
the second CIR and data transmitted at the second transmit antenna.

* * * * *